United States Patent
Ichihashi et al.

(10) Patent No.: US 11,412,762 B2
(45) Date of Patent: Aug. 16, 2022

(54) METHOD OF MAKING PET FOOD

(71) Applicants: Unicharm Corporation, Ehime (JP); Kyushu Petfood Co., Ltd., Fukuoka (JP)

(72) Inventors: Masaki Ichihashi, Itami (JP); Yosuke Kobayashi, Itami (JP); Kentarou Kiya, Kasuya-gun (JP)

(73) Assignees: UNICHARM CORPORATION, Ehime (JP); KYUSHU PETFOOD CO., LTD., Fukuoka (JP)

( * ) Notice: Subject to any disclaimer, the term of this patent is extended or adjusted under 35 U.S.C. 154(b) by 74 days.

(21) Appl. No.: 16/845,011

(22) Filed: Apr. 9, 2020

(65) Prior Publication Data

US 2020/0229468 A1    Jul. 23, 2020

Related U.S. Application Data

(63) Continuation of application No. 15/557,167, filed as application No. PCT/JP2016/056995 on Mar. 7, 2016, now abandoned.

(30) Foreign Application Priority Data

Mar. 13, 2015  (JP) .............................. JP2015-051468

(51) Int. Cl.

| | |
|---|---|
| *A23K 50/45* | (2016.01) |
| *A23K 40/25* | (2016.01) |
| *A23K 20/26* | (2016.01) |
| *A23K 20/147* | (2016.01) |
| *A23K 10/20* | (2016.01) |
| *A23K 10/30* | (2016.01) |
| *A23K 40/00* | (2016.01) |
| *A23K 20/10* | (2016.01) |

(52) U.S. Cl.
CPC .............. *A23K 50/45* (2016.05); *A23K 10/20* (2016.05); *A23K 10/30* (2016.05); *A23K 20/10* (2016.05); *A23K 20/147* (2016.05); *A23K 20/26* (2016.05); *A23K 40/00* (2016.05); *A23K 40/25* (2016.05)

(58) Field of Classification Search
CPC ...... A23K 50/45; A23K 20/147; A23K 20/26; A23K 20/10; A23K 40/00; A23K 40/25; A23K 10/20; A23K 10/30
See application file for complete search history.

(56) References Cited

U.S. PATENT DOCUMENTS

| | | | |
|---|---|---|---|
| 3,779,772 A | 12/1973 | Forkner | |
| 3,821,428 A | 6/1974 | Farkas | |
| 4,006,266 A | 2/1977 | Bone et al. | |
| 7,666,460 B1 | 2/2010 | Keogh | |
| 2004/0033300 A1 | 2/2004 | Takahashi et al. | |
| 2006/0165854 A1* | 7/2006 | Levin ..................... | A23K 20/20 426/132 |
| 2010/0055284 A1* | 3/2010 | Karwowski ........... | A23L 29/212 426/560 |
| 2011/0111089 A1 | 5/2011 | Levin et al. | |
| 2013/0273125 A1* | 10/2013 | Barnvos ................. | A23K 20/26 424/401 |
| 2014/0010916 A1* | 1/2014 | Pibarot .................. | A23K 40/25 426/19 |
| 2015/0147454 A1 | 5/2015 | Russell-Maynard | |
| 2015/0216204 A1* | 8/2015 | Juravic .................. | A23K 50/45 426/657 |

FOREIGN PATENT DOCUMENTS

| | | |
|---|---|---|
| CN | 102008026 A | 4/2011 |
| GB | 1088138 A | 10/1967 |
| JP | 2003-259840 A | 9/2003 |
| JP | 2004-208703 A | 7/2004 |
| JP | 2006-158265 A | 6/2006 |
| JP | 2008-029339 A | 2/2008 |
| JP | 2012-060904 A | 3/2012 |

OTHER PUBLICATIONS

International Search Report in PCT/JP2016/056995, dated Jun. 7, 2016.
Yiming Wei, "Grain Quality and Food Quality", Shaanxi People's Publishing House, Sep. 2002, pp. 115-116, first edition, first printing, 3pp.
Office Action in CN Application No. 201680014891.3, dated Jan. 6, 2021, 21pp.
"Bakery Products", Shanghai Food Technology, translated by Yujing Zhang, Dec. 31, 1982, No. 1, p. 56, 2pp.
Office Action in CN Application No. 201680014891.3, dated Jul. 1, 2020, 20pp.

* cited by examiner

*Primary Examiner* — Walter A Moore
(74) *Attorney, Agent, or Firm* — Hauptman Ham, LLP

(57) ABSTRACT

Provided is pet food which is obtained by heating and foaming dough, the dough including: cereals which contain wheat; animal-derived raw ingredients; and an expanding agent, in which a wheat protein content in the dough is 1.5% by mass or greater, and the moisture content in a pet food product is in a range of 20% to 35% by mass.

9 Claims, No Drawings

METHOD OF MAKING PET FOOD

CROSS REFERENCE TO RELATED APPLICATIONS

This is a continuation of U.S. application Ser. No. 15/557,167, filed Sep. 11, 2017, which is a National Phase of International Application Number PCT/JP2016/056995, filed Mar. 7, 2016, which claims the benefit of Japanese Priority Patent Application JP 2015-051468 filed on Mar. 13, 2015, the entire contents of which are incorporated herein by reference.

TECHNICAL FIELD

The present invention relates to pet food produced by using an expanding agent.

Priority is claimed on Japanese Patent Application No. 2015-051468, filed on Mar. 13, 2015, the content of which is incorporated herein by reference.

BACKGROUND ART

PTL 1 discloses bolo for dogs produced by using an expanding agent.

Specifically, Examples 2 and 4 of PTL 1 describe an example in which bolo for dogs having a moisture content of approximately 14.1% by mass is produced by forming dough into which approximately 90 parts by mass of potato starch, approximately 10 parts by mass of wheat flour, bean curd refuse powder, sugar, a starch decomposition product, liquid egg, glycerin, 1 or 2 parts by mass of an expanding agent, and water are mixed and baking the formed dough in an oven.

Further, PTL 1 describes that bolo having a soft and moisturized texture can be produced by increasing the amount of water to be added to the dough using water-holding capacity of bean curd refuse and suppressing evaporation of moisture during the baking. In PTL 1, there is no description of using animal-derived raw ingredients such as meat nor foaming dough during the baking.

CITATION LIST

Patent Literature

[PTL 1] Japanese Unexamined Patent Application, First Publication No. 2012-60904

SUMMARY OF INVENTION

Technical Problem

Pet food that contains animal-derived raw ingredients such as chicken breast jerky or beef jerky has high palatability for pets and is highly popular as pet food for snack.

As the result of repeated production of trial products based on an idea of the possibility for producing pet food having a new unconventional texture by swelling dough containing animal-derived raw ingredients according to a method of heating and foaming dough using an expanding agent, the present inventors have found that the dough containing animal-derived raw ingredients is unlikely to be swollen in some cases and, in that case, the dough is swollen during heating by using a large amount of expanding agent, but the dough is easily shrunk during cooling.

An object of the present invention is to provide new pet food obtained by swelling dough containing animal-derived raw ingredients through foaming.

Solution to Problem

As the result of intensive research conducted by the present inventors, it was found that the shrinkage of dough after being heated and foamed can be suppressed by increasing the content of wheat protein in the dough, thereby completing the present invention.

An embodiment of the present invention is as follows.

[1] Pet food which is obtained by heating and foaming dough, the dough including: cereals which contain wheat; animal-derived raw ingredients; and an expanding agent, in which a wheat protein content in the dough is 1.5% by mass or greater, and the moisture content in a pet food product is in a range of 20% to 35% by mass.

[2] The pet food according to [1], in which the moisture content in the dough is in a range of 30% to 60% by mass.

[3] The pet food according to [1] or [2], in which the animal-derived raw ingredients contain meat which has not been subjected to a heat treatment.

[4] The pet food according to any one of [1] to [3], in which the dough further contains dextrin.

[5] The pet food according to any one of [1] to [4], in which the dough further contains alginic acid ester.

[6] The pet food according to any one of [1] to [5], in which the content of the expanding agent is in a range of 1% to 4% by mass based on the total amount of raw ingredients in the dough.

Advantageous Effects of Invention

According to the present invention, it is possible to provide new pet food obtained by swelling dough containing animal-derived raw ingredients through foaming.

DESCRIPTION OF EMBODIMENTS

[Moisture Content in Product]

In the present specification, the moisture content is a value obtained by the following measurement method.

An object to be measured is ground using a grinder by passing the object through a sieve having a size of 1 mm and then the object is used as an analytical sample. 2 to 5 g of the analytical sample is accurately weighed, put into an aluminum weighing dish (after the sample has been dried in advance, the weight thereof is accurately weighed), dried at a temperature of 135±2° C. for 2 hours, and left to be cooled in a desiccator. Next, the weight thereof is accurately weighed, and then the moisture content is acquired from a difference between the weights weighed before and after the drying.

In the present specification, the moisture content of the pet food product is a value obtained by measurement immediately after a pet food product produced by heating and foaming dough, cooling the dough at room temperature, storing the resultant in a packaging container, and sealing the packaging container has been opened within 30 days from the date of manufacture or is a value obtained by measurement under the conditions similar to the conditions described above.

[Crude Protein Content]

In the present specification, the value of the crude protein content is obtained by measurement using a Kjeldahl method. Specifically, the crude protein content is calculated by multiplying the nitrogen content (unit %) measured using a Kjeldahl method by 6.25 as a protein coefficient.

According to the present method, the total content of amino acids and aminos other than pure proteins is measured as the crude protein content.

<Raw Ingredients>

The pet food of the present embodiment is obtained by heating and foaming dough which includes cereals containing wheat, animal-derived raw ingredients, and an expanding agent.

[Expanding Agent]

The expanding agent is not particularly limited as long as the expanding agent generates gas when heated, and a known expanding agent can be used. Preferred examples of the known expanding agent include sodium bicarbonate (sodium hydrogen carbonate) and baking powder. Baking powder is a composition which optionally contains alum (burnt alum, ammonium alum, or the like) which is a component contributing to expansion in addition to sodium bicarbonate serving as a base and into which plural kinds of auxiliary agents are mixed. Commercially available baking powder can be used as appropriate.

The expression "dough is heated and foamed" means that the expanding agent in the dough is heated to generate gas so that bubbles are formed (foamed) in the dough. The pet food obtained by heating and foaming dough has a porous structure such as bread or sponge.

The amount of the expanding agent to be mixed is preferably in a range of 1% to 4% by mass, more preferably in a range of 1.4% to 3.6% by mass, and still more preferably in a range of 1.8% to 3.2% by mass based on the total amount of raw ingredients in the dough (not including added water, the same applies hereinafter).

In the present embodiment, the amount of the expanding agent to be mixed indicates the total amount of components contributing to expansion. Therefore, in a case where sodium bicarbonate is used alone, the amount of sodium bicarbonate is the amount of the expanding agent. Further, in a case where baking powder containing alum in addition to sodium bicarbonate is used, the total amount of sodium bicarbonate and alum is the amount of the expanding agent.

When the amount of the expanding agent to be mixed is greater than or equal to the lower limit of the above-described range, bubbles are sufficiently formed in the dough. When the amount of the expanding agent to be mixed is less than or equal to the upper limit thereof, the dough is not extremely swollen and thus excellent formability is easily obtained. Further, when the amount of the expanding agent to be mixed is extremely large, the palatability may be decreased.

[Cereals]

As the cereals, cereals known as raw ingredients of pet food can be used. Examples of the known cereals include corn, wheat, rice, barley, oats, and rye. These may be used alone or in combination of two or more kinds thereof. In the present embodiment, at least wheat is used.

Further, in order to adjust the content of wheat protein in the dough, it is preferable that a processed product containing wheat protein is used as a part of cereals in addition to wheat. As such a processed product, a product in which the content of starch is less and the content of proteins is greater than the content of wheat is preferable. For example, wheat gluten is preferable. As the wheat gluten, commercially available powder wheat gluten can be used.

The content of wheat protein is 1.5% by mass or greater, preferably 2% by mass or greater, and more preferably 2.5% by mass or greater based on the total amount of raw ingredients in the dough. The shrinkage of the dough after being swollen by being heated and foamed is desirably suppressed when the content of wheat protein is 1.5% by mass or greater.

In addition, when the content of wheat protein is extremely high, granules tend to be hard. The upper limit of the content of wheat protein depends on the hardness of granules intended to be obtained and is preferably 10% by mass or less, more preferably 8% by mass or less, still more preferably 6% by mass or less, and particularly preferably 4% by mass or less based on the total amount of raw ingredients.

In the present specification, the content of wheat protein is a value calculated from the protein content in wheat flour and the protein content in a processed product (preferably wheat gluten) containing wheat protein mixed into the raw ingredients, and the mixing ratio of these. As the protein content, a value of the raw ingredient standard can be used.

The total amount of cereals is preferably in a range of 6% to 44% by mass, more preferably in a range of 11% to 26% by mass, and still more preferably in a range of 14% to 21% by mass based on the total amount of raw ingredients in the dough. When the total amount of cereals is greater than or equal to the lower limit of the above-described range, excellent formability is easily obtained. When the total amount thereof is less than or equal to the upper limit, the palatability is not affected much.

The proportion of the total amount of wheat and the processed product containing wheat protein in the total amount of cereals used for preparation of the dough is preferably 60% by mass or greater, more preferably 70% by mass or greater, and still more preferably 80% by mass or greater. The proportion thereof may be 100% by mass.

[Animal-Derived Raw Ingredients]

Examples of the animal-derived raw ingredients include meat (including internal organs) derived from animals (such as fish and domestic animals such as cattle, pig, and chicken), a meat protein decomposed product (digest), and eggs. These may be used alone or in combination of two or more kinds thereof. It is preferable to use at least meat.

From the viewpoint that the palatability for pets is further improved, it is particularly preferable that meat which has not been subjected to a heat treatment is used as the above-described meat.

The total amount of the animal-derived raw ingredients is preferably in a range of 10% to 50% by mass, more preferably in a range of 30% to 50% by mass, and still more preferably in a range of 40% to 50% by mass based on the total amount of raw ingredients in the dough. When the total amount of the animal-derived raw ingredients is greater than or equal to the lower limit of the range, excellent palatability is easily obtained. When the total amount of the animal-derived raw ingredients is less than or equal to the upper limit, a porous structure formed by foaming is easily obtained.

From the viewpoint of easily obtaining excellent palatability, it is preferable that the raw ingredient whose amount to be mixed (on a mass basis), as a single raw ingredient, is the largest is meat among the raw ingredients used for the preparation of dough.

Such pet food containing a large amount of meat is desirable particularly as pet food for snack.

[Other Raw Ingredients]

Known raw ingredients used to produce pet food can be mixed into the dough as appropriate in addition to the above-described raw ingredients.

Examples of the known raw ingredients include beans (such as whole soybeans and soybean protein), fats and oils (such as animal fats and oils or vegetable fats and oils), vegetables, powdery additives (such as vitamins, minerals, amino acids, preservatives, pH adjusting agents, flavoring raw ingredients, fibers, colorants, and palatability enhancers), and liquid additives (such as thickening stabilizers and quality improving agents).

From the viewpoint that the shrinkage after the dough is heated and foamed is easily suppressed, it is preferable that alginic acid ester which is a powdery additive is mixed into the dough.

In a case where alginic acid ester is mixed into the dough, the content of the alginic acid ester is preferably 0.05% by mass or greater, more preferably 0.1% by mass or greater, and still more preferably 0.3% by mass or greater based on the total amount of raw ingredients in the dough. When the content of the alginic acid ester is greater than or equal to the lower limit of the above-described range, the effects of suppressing the shrinkage is easily and sufficiently obtained.

Further, when the content of the alginic acid ester is extremely large, granules tend to be hard. From the viewpoint that granules to be obtained are not extremely hard, the content of the alginic acid ester is preferably 1% by mass or less, more preferably 0.8% by mass or less, and still more preferably 0.6% by mass or less.

It is preferable that dextrin which is a powdery additive is mixed into the dough from the viewpoint that the shrinkage after the dough is heated and foamed is easily suppressed. Further, cellulose can be used in place of or in addition to dextrin and the same shrinkage suppression effects can be obtained as in the case of using dextrin.

In a case where dextrin is mixed into the dough, the content of dextrin is preferably 0.1% by mass or greater, more preferably 0.2% by mass or greater, and still more preferably 0.4% by mass or greater based on the total amount of raw ingredients in the dough. When the content thereof is greater than or equal to the lower limit, the effects of suppressing the shrinkage is easily and sufficiently obtained.

Meanwhile, when the content of dextrin is extremely high, there is a tendency that binding properties of components constituting granules are degraded and the granules become brittle. The content of dextrin is preferably 3% by mass or less, more preferably 2% by mass or less, and still more preferably 1% by mass or less.

Trehalose which is a powdery additive contributes to a moisturizing effect of granules and an anti-aging effect of starch.

It is preferable that trehalose is mixed into the dough from the viewpoint that the softness of granules is improved and the palatability is increased.

In a case where trehalose is mixed into the dough, the content thereof is preferably in a range of 0.5% to 5% by mass, more preferably in a range of 1% to 3% by mass, and still more preferably in a range of 1.5% to 2% by mass based on the total amount of raw ingredients in the dough.

From the viewpoint of obtaining excellent storability, it is preferable that a preservative (for example, sorbic acid or potassium sorbate) exhibiting effects in an acidic region is mixed into the dough and a pH adjusting agent is mixed into the dough such that the pH of the pet food (granules) is set to be in the acidic region.

From the viewpoint that expansibility is improved and granules are greatly swollen after being heated and foamed, it is preferable that a pH adjusting agent, obtained by forming an acid component which is in a solid state at room temperature (25° C.) into a granular shape by coating the acid component with fats and oils which are in a solid state at room temperature, is used as the pH adjusting agent. The acid component coated with fats and oils does not come into contact with the components in the dough before being heated and comes into contact with the components in the dough due to the coated layer being melted during the heating. In this manner, it is considered that generation of gas, caused by a reaction of the expanding agent in the dough with the acid component before the dough is heated and foamed, is prevented and the dough is efficiently and stably foamed during the heating.

Examples of the acid component which is in a solid state at room temperature include fumaric acid, citric acid, and malic acid. Examples of such fats and oils to be applied to the acid component include hardened oil such as palm oil.

The amount of the pH adjusting agent to be mixed is set such that a desired pH value can be obtained. From the viewpoint that the palatability is easily decreased when the acidity is extremely high, the amount of the pH adjusting agent to be mixed is preferably 3% by mass or less and more preferably 1.5% by mass or less based on the total amount of raw ingredients in the dough.

<Pet Food>

The shape of pet food according to the present embodiment is not particularly limited as long as the shape thereof is suitable for a pet to eat. Examples of the shape of pet food include various granular shapes (such as a pellet shape) and a rod shape (such as a stick shape).

The moisture content of the product of the pet food according to the present embodiment is in a range of 20% to 35% by mass. When the moisture content of the product is in the above-described range, suitable softness is obtained so that the palatability for a pet is improved. Particularly, when the pet food has a porous structure and the moisture content of the product is in the above-described range, excellent elasticity is obtained so that the palatability for a pet is further improved. The moisture content of the product is more preferably in a range of 25% to 30% by mass.

The moisture content of the product can be adjusted according to the moisture content in the dough, the heating conditions for heating the dough, and/or the drying conditions in a case where a drying process is performed.

The crude protein content in the pet food of the present embodiment is preferably in a range of 10% to 35% by mass, more preferably in a range of 15% to 30% by mass, and still more preferably in a range of 20% to 30% by mass. When the content thereof is greater than or equal to the lower limit of the above-described range, excellent palatability is easily obtained. When the content thereof is less than or equal to the upper limit, a more excellent porous structure is easily formed through foaming.

<Production Method>

The pet food of the present embodiment is produced by performing a process of mixing the whole raw ingredients and water (added water) to prepare dough, a process of forming the dough, and a process of heating and foaming the formed product.

A pet food product is obtained by heating and foaming the formed product, performing a drying process on the formed product as necessary, cooling the resultant at room temperature, storing the resultant in a packaging container, and then sealing the container.

The dough may be formed into a desired product shape before the heating and the foaming or formed into a desired product shape by performing primary forming before the heating and the foaming, heating and foaming the dough, and then performing secondary forming of the dough.

For example, the pet food product may have a granular shape or a stick shape, which is a final product shape, by performing extrusion forming (primary forming) on the dough into a string shape, heating and foaming the formed product having a string shape, and then cutting (secondary forming) the formed product to have a predetermined length.

The moisture content in the dough is preferably in a range of 30% to 60% by mass, more preferably in a range of 35% to 55% by mass, and still more preferably in a range of 40% to 50% by mass. When the moisture content in the dough is in the above-described range, excellent formability is easily obtained.

Particularly, in a case where the dough is continuously formed using an extrusion forming machine, it is preferable that the moisture content in the dough is in the above-described range because the dough is hard so that the dough is unlikely to be extruded when the moisture content in the dough is extremely low and the shape of the extruded formed product is not maintained when the moisture content in the dough is extremely large.

Further, dough having a high moisture content of 35% by mass or greater is unlikely to be formed and puffed when a method of producing porous puffed granules using an extruder of the related art is employed, but pet food having an excellent porous structure can be produced according to the present embodiment.

The moisture content in the dough of the present specification indicates the total amount of moisture and added water in the raw ingredients.

It is preferable that the heating conditions for heating and foaming the formed product are set such that a desired foamed state is obtained. When the heating temperature is too low or the heating time is too short, the foaming becomes insufficient and thus an excellent porous structure cannot be obtained. On the contrary, when the heating temperature is too high or the heating time is too long, there is a concern that the dough may be drastically shrunk because the dough is extremely swollen.

For example, the heating temperature as the ambient temperature is preferably in a range of 80° C. to 120° C., more preferably in a range of 90° C. to 110° C., and still more preferably in a range of 95° C. to 100° C. The heating time depends on the size or the heating temperature of a formed product to be heated and is preferably in a range of 4 to 40 minutes.

The moisture content of the product can be adjusted to a desired value by performing the drying process after the heating and the foaming.

The drying process can be performed appropriately using a known drying method.

EXAMPLES

Hereinafter, the present invention will be described in detail with reference to the following examples, but the present invention is not limited to these examples.

Main raw ingredients listed in Table 1 are as follows.
Meat: frozen chicken breast, 75% by mass of moisture
Wheat flour: 13% by mass of moisture, 10% by mass of wheat protein
Wheat gluten: 8% by mass of moisture, 75% by mass of wheat protein
Soybean protein: 7% by mass of moisture
Expanding agent a: baking powder, 39% by mass of sodium bicarbonate, 35% by mass of burnt alum, containing monocalcium phosphate, L-potassium hydrogen tartrate, and sucrose fatty acid ester as auxiliary agents
Expanding agent b: baking powder, 28% by mass of sodium bicarbonate, 25% by mass of ammonium alum, containing acidic sodium pyrophosphate, higher fatty acid, and tricalcium phosphate as auxiliary agents
Expanding agent c: baking powder, 27% by mass of sodium bicarbonate, 26% by mass of burnt alum, containing monocalcium phosphate, L-potassium hydrogen tartrate, and glycerin fatty acid ester as auxiliary agents
pH adjusting agent a: fumaric acid coated with fats and oils
pH adjusting agent b: lactic acid
Dextrin: 7% by mass of moisture
Trehalose: 1.5% by mass of moisture Examples 1 to 9

Examples 1 to 7 are application examples, and Examples 8 and 9 are comparative examples in which the content of wheat protein is low.

First, doughs were prepared by adding raw ingredients with the formulations listed in Table 1 and water (added water), and mixing the mixtures. The amounts of added water were adjusted such that the doughs had the same level of softness. The moisture content of the doughs of each example slightly varied, but was approximately 45% by mass. The mixing ratios listed in Table 1 indicate ratios (unit: part by mass) based on the total amount of raw ingredients that do not contain added water.

Next, the doughs were extruded from a nozzle, formed into a long square string shape (approximately square whose cross section had a side with a length of approximately 7 mm), heated, and foamed. The doughs were heated under an ambient temperature condition of 90° C. for 40 minutes.

Next, the doughs were cooled under severe conditions in order to evaluate whether the doughs were shrunk after being heated and foamed. In other words, the doughs were rapidly cooled by applying cool air to the granules after the heating and the foaming.

After the doughs were cooled, a granular shape was obtained by cutting the materials in a square string shape at every length of approximately 10 mm.

Further, granular pet food was obtained by heating and drying the resulting granules at an ambient temperature of 65° C. for 20 to 30 minutes.

The formulation of Example 5 was obtained by adding 0.5 parts by mass of dextrin to the formulation of Example 6, the formulation of Example 6 was obtained by adding 0.42 parts by mass of alginic acid ester to the formulation of Example 7, and the formulation of Example 7 was obtained by adding 2.5 parts by mass of gluten to the formulation of Example 8.

(Evaluation)

The surface of pet food (granules) immediately after the heating and the surface of pet food (granules) after the cooling were visually observed and the swollen states of granules were compared to each other.

Even if granules, whose surface did not have wrinkles, in a swollen state were obtained immediately after the heating, granules were shrunk and wrinkles were generated after the cooling in some cases. This means that granules are greatly shrunk when a large amount of wrinkles are generated.

Pet food (immediately after the heating and after the cooling) obtained in Examples 1 to 9 was compared and ranked in a descending order of the amount of wrinkles. The results thereof are listed in Table 1. For example, it was visually confirmed that the degrees of shrinkage were different between the first rank and the second rank. In the first rank, the amount of wrinkles was larger and the shrinkage was greater. The states (the state of shrinkage and the swollen state of granules in a case where wrinkles were not generated) of the surfaces were the same as each other between granules with the same rank. Wrinkles were not generated in the fourth rank and the fifth rank and, accordingly, the pet food in which granules were more greatly swollen was ranked as the fifth rank.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Formulation of raw ingredients [parts by mass] | Animal-derived raw ingredients | Meat | 43.0 | 43.0 | 43.0 | 43.0 | 43.0 | 43.0 | 43.0 | 43.0 | 34.0 |
| | Cereals | Wheat flour | 12.9 | 13 | 13 | 13 | 13 | 13 | 13 | 13 | 13 |
| | | Gluten | 2.6 | 2.5 | 2.5 | 2.5 | 2.5 | 2.5 | 2.5 | 0 | 0 |
| | Beans | Soybean protein | 4.3 | 4.0 | 4.0 | 4.0 | 4.0 | 4.0 | 4.0 | 4.0 | 4.0 |
| | Fats and oils | Crude beef tallow and the like | 3.6 | 4.2 | 4.2 | 4.2 | 4.2 | 4.2 | 4.2 | 4.2 | 4.2 |
| | Liquid raw ingredients | Thickening stabilizer | 17.4 | 17.5 | 17.5 | 17.5 | 17.5 | 17.5 | 17.5 | 17.5 | 17.5 |
| | | Quality improving agent | 3.5 | 3.5 | 3.5 | 3.5 | 3.5 | 3.5 | 3.5 | 3.5 | 3.5 |
| | Expanding agent | Expanding agent a | 3.4 | 3.5 | 0 | 0 | 3.5 | 3.5 | 3.5 | 3.5 | 3.5 |
| | | Expanding agent b | 0 | 0 | 3.5 | 0 | 0 | 0 | 0 | 0 | 0 |
| | | Expanding agent c | 0 | 0 | 0 | 3.5 | 0 | 0 | 0 | 0 | 0 |
| | pH adjusting agent | pH adjusting agent a | 1.1 | 1.1 | 0 | 0 | 0 | 0 | 0 | 0 | 0 |
| | | pH adjusting agent b | 0 | 0 | 0.9 | 0.9 | 0.9 | 0.9 | 0.9 | 0.9 | 0.9 |
| | Preservative | Sorbic acid | 0.2 | 0.2 | 0.2 | 0.2 | 0.2 | 0.2 | 0.2 | 0.2 | 0.2 |
| | Dextrin | | 0.5 | 0 | 0 | 0 | 0.5 | 0 | 0 | 0 | 0 |
| | Trehalose | | 1.7 | 1.7 | 1.7 | 1.7 | 1.7 | 1.7 | 1.7 | 1.7 | 1.7 |
| | Alginic acid ester | | 0.4 | 0.42 | 0.42 | 0.42 | 0.42 | 0.42 | 0 | 0 | 0 |
| | Raw gelatin (comparative examples) | | 0 | 0 | 0 | 0 | 0 | 0 | 0 | 0 | 8.5 |
| | Other solid raw ingredients | | 5.4 | 5.0 | 5.0 | 5.0 | 5.0 | 5.0 | 5.0 | 5.0 | 5.0 |
| | Total amount of raw ingredients | | 100.0 | 99.6 | 99.4 | 99.4 | 99.9 | 99.4 | 99.0 | 96.5 | 96.0 |
| | Total moisture content in raw ingredients | | 37.1 | 37.1 | 37.1 | 37.1 | 37.1 | 37.1 | 37.1 | 36.9 | 37.5 |
| Wheat protein in raw ingredients [% by mass] | | | 3.24 | 3.19 | 3.19 | 3.19 | 3.18 | 3.19 | 3.21 | 1.35 | 1.35 |
| Expanding agents in raw ingredients [% by mass] | | | 2.52 | 2.60 | 1.87 | 1.87 | 2.59 | 2.61 | 2.62 | 2.68 | 2.70 |
| Dough | Moisture content in dough [% by mass] | | 43 to 47 | | | | | | | | |
| Pet food | Moisture content in product [% by mass] | | 28 to 29 | | | | | | | | |
| | Crude protein content [% by mass] | | Approximately 24 | Approximately 24 | Approximately 24 | Approximately 24 | Approximately 24 | Approximately 24 | Approximately 24 | Approximately 23 | Approximately 22 |
| | Evaluation (swollen state of granules) | Immediately after heating | 5 | 5 | 4 | 4 | 4 | 4 | 4 | 4 | 4 |
| | | After cooling | 5 | 4 | 3 | 3 | 4 | 3 | 2 | 1 | 1 |

As shown from the results listed in Table 1, in all pet food of Examples 1 to 9, granules in a swollen state were obtained immediately after the heating. In Examples 1 and 2 in which a pH adjusting agent obtained by coating an acid component with fats and oils was used, the granules were more greatly swollen and the expansibility at the time of the heating and the foaming was excellent compared to the pet food of Examples 3 to 9 in which an acid component which was not coated with fats and oils was used.

Among Examples 1 to 9, in Examples 1 to 7 in which gluten was mixed into dough to increase the content of wheat protein in the dough, the shrinkage after the heating and the foaming was improved compared to Examples 8 and 9 in which gluten was not mixed into dough.

All pet food obtained in Examples 1 to 7 had a porous structure and the granules thereof had elasticity. Further, in a large number of granules in Examples 1 to 7 which were continuously produced, there was no variation in the degree of shrinkage and the quality stability was also excellent.

In contrast, in Examples 8 and 9, the degree of shrinkage of granules was large, some bubbles in the granules collapsed, and the elasticity was inferior.

Particularly, when Example 5 was compared to Example 6, it was confirmed that the shrinkage after the heating and the foaming was improved by adding dextrin.

Further, when Example 6 was compared to Example 7, it was confirmed that the shrinkage after the heating and the foaming was improved by adding alginic acid ester.

The invention claimed is:

1. A method of producing a pet food, the method consisting of:
   providing a raw ingredient consisting of wheat, wheat gluten, animal-derived raw ingredients, dextrin, alginic acid ester, an expanding agent, water, beans, fats and oils, thickening stabilizers, quality improving agents, pH adjusting agents, preservatives and trehalose;
   providing a mixing device;
   placing the raw ingredient into the mixing device;
   mixing the raw ingredient with the mixing device to prepare a dough;
   providing an extruder;
   placing the dough into the extruder;
   extruding the dough with the extruder to obtain an extruded dough;
   providing a heating device;
   placing the extruded dough into the heating device;
   heating and foaming the extruded dough with the heating device to obtain a heat-foamed dough;
   providing a cutting device;
   placing the heat-foamed dough into the cutting device;
   cutting the heat-foamed dough with the cutting device to obtain a cut dough; providing a dryer;
   placing the cut dough into the dryer;
   drying the cut dough with the dryer to obtain a dried pet food having a moisture content in a range of 20% to 35% by mass;
   cooling the dried pet food to room temperature to obtain a cooled pet food;
   storing the cooled pet food in a packaging container;
   providing a sealing device;
   placing the packaging container having the cooled pet food stored therein into the sealing device; and
   sealing the packaging container having the cooled pet food stored therein with the sealing device,
   wherein the wheat protein content in the dough is 1.5% by mass or greater based on a total amount of the raw ingredient excluding water,
   wherein heating and foaming the extruded dough is conducted at an ambient temperature of 80° C. to 90° C. for 4 to 40 minutes.

2. The method according to claim 1,
   wherein the animal-derived raw ingredients contain meat which has not been subjected to a heat treatment.

3. The method according to claim 1,
   wherein a content of the expanding agent is in a range of 1% to 4% by mass based on the total amount of the raw ingredient excluding water.

4. The method according to claim 1,
   wherein the wheat protein content in the dough is 2.5% by mass or greater based on the total amount of the raw ingredient excluding water.

5. The method according to claim 4,
   wherein the wheat protein content in the dough is 10% by mass or less based on the total amount of the raw ingredient excluding water.

6. The method according to claim 1,
   wherein a total amount of wheat in the dough is in a range of 6% to 44% by mass based on the total amount of the raw ingredient excluding water.

7. The method according to claim 1,
   wherein the expanding agent comprises sodium bicarbonate or baking powder.

8. The method according to claim 1,
   wherein a content of the expanding agent is in a range of 1.8% to 3.2% by mass based on the total amount of the raw ingredient excluding water.

9. The method according to claim 1,
   wherein a moisture content in the dough is in a range of 30% to 60% by mass.

* * * * *